US005914843A

United States Patent [19]

Hopkins et al.

[11] Patent Number: 5,914,843

[45] Date of Patent: Jun. 22, 1999

[54] NEON POWER SUPPLY WITH IMPROVED GROUND FAULT PROTECTION CIRCUIT

[75] Inventors: William Thomas Hopkins, Dickson, Tenn.; Thomas Eugene Dean, San Ramon, Calif.

[73] Assignee: France/Scott Fetzer Company, West Fairview, Tenn.

[21] Appl. No.: 08/984,675

[22] Filed: Dec. 3, 1997

[51] Int. Cl.[6] ........ H02H 3/00

[52] U.S. Cl. ........ 361/42; 361/93; 315/DIG. 7

[58] Field of Search ........ 361/42–50, 91, 361/93, 98; 315/DIG. 1, DIG. 2, DIG. 4, DIG. 5, DIG. 7

[56] References Cited

U.S. PATENT DOCUMENTS

| | | | |
|---|---|---|---|
| 4,016,489 | 4/1977 | Adams et al. | 324/51 |
| 4,507,698 | 3/1985 | Nilssen | 361/42 |
| 4,563,719 | 1/1986 | Nilssen | 361/45 |
| 4,613,934 | 9/1986 | Pacholok | 363/131 |
| 4,663,571 | 5/1987 | Nilssen | 315/244 |
| 4,675,576 | 6/1987 | Nilssen | 315/242 |
| 4,855,860 | 8/1989 | Nilssen | 361/45 |
| 4,939,427 | 7/1990 | Nilssen | 315/209 R |
| 5,049,787 | 9/1991 | Nilssen | 315/209 R |
| 5,089,752 | 2/1992 | Pacholok | 315/307 |
| 5,241,443 | 8/1993 | Efantis | 361/36 |
| 5,349,273 | 9/1994 | Pacholok | 315/307 |
| 5,457,360 | 10/1995 | Notohamiprodjo et al. | 315/219 |
| 5,550,437 | 8/1996 | Hopkins et al. | 315/209 R |

FOREIGN PATENT DOCUMENTS 0 615 402A2 4/1994 European Pat. Off. ........ H05B 41/29

OTHER PUBLICATIONS

Efantis, Tony, *Ground–Fault Protection on Neon Secondaries,* Signs of the Times, Jul. 1996, pp. 130–133, 188.

*Primary Examiner*—Ronald W. Leja
*Attorney, Agent, or Firm*—Wood,Herron & Evans, L.L.P.

[57] ABSTRACT

A power supply power supply circuit of the kind which includes a transformer having primary and secondary windings and an oscillator for driving the primary winding in a bi-directional fashion, suitable for driving gas discharge lighting such as neon signs, which prevents dangerous overvoltage output conditions and detects relatively low level ground fault currents. The transformer includes a clamp winding which is in proximity to and capacitively coupled to the secondary winding. The terminals of the clamp winding are connected to a current imbalance detection circuit for detecting imbalance between the current flowing into one clamp winding terminal and the current out of the other clamp winding terminal. In a ground fault condition, ground fault current flows in an unbalanced fashion into the clamp winding terminal(s), and through the capacitive coupling to the secondary winding. This ground fault current is detected by the current imbalance detection circuit, causing the current imbalance detection circuit to generate an electrical signal indicative of ground fault current, which shuts down the oscillator.

20 Claims, 3 Drawing Sheets

NEON POWER SUPPLY WITH IMPROVED GROUND FAULT PROTECTION CIRCUIT

CROSS-REFERENCE TO RELATED APPLICATION

This application is related to previously-filed, copending U.S. patent application Ser. No. 08/838,060, filed Apr. 17, 1997, entitled "SAFETY-ENHANCED TRANSFORMER CIRCUIT", now U.S. Pat. No. 5,847,909, which is assigned to the same assignee as the present application, and is incorporated by reference herein in its entirety.

FIELD OF THE INVENTION

The present invention relates to electronic neon power supplies and the like.

BACKGROUND OF THE INVENTION

Power supplies are typically used in powering gas discharge lighting, to convert a low-frequency, low impedance, low voltage power source, such as a 120 Volt 60 Hz AC wall outlet, into a high frequency, high voltage and high impedance source suitable for connection to the gas discharge tube light. In typical North American applications, a rectifier rectifies the 120 Volt AC source, and the rectified voltage is filtered to produce an approximately 170 Volt DC source, an oscillator converts the DC source into a high frequency AC source, and a transformer steps up the voltage of this high frequency AC source.

A neon sign (hereinafter also called "neon tubing"), is one example of a gas discharge lamp. Neon signs typically use a transformer (hereinafter also called a "neon transformer") to illuminate the sign. The following discussion of the background and the invention will refer to power supply circuits used for neon signs, however, it will be understood that principles of the present invention have application to power supply circuits for other gas discharge tube lamps as well.

Because the output impedance of a neon power supply is typically relatively large, the output voltage of the neon power supply varies widely depending on the load. Many known neon power supplies suffer from excessive output voltage when operated without load or with a predominantly capacitive load. This may be due to the resonance between the effective transformer output impedance and the output (or stray) capacitance within the transformer or connected to its secondary. Excessive output voltage produces excessive stress on the internal insulation of the transformer, the insulation of the high voltage wiring leading from the neon power supply, and the insulating materials at the supports for holding the gas discharge tube light. The excessive output voltage also violates certain agency safety requirements.

One circuit for preventing excessive output voltages is described by Hopkins et al., U.S. Pat. No. 5,550,437, which is assigned to the same assignee as the present application, and hereby incorporated by reference herein in its entirety. Hopkins et al. describes an neon power supply circuit in which the transformer core incorporates, in addition to primary and secondary windings, a clamp winding. The clamp winding is magnetically closely coupled to the secondary winding via the transformer core, and has terminals connected through a rectifier network to the 170 Volt DC power source produced from the AC line voltage. In an output overvoltage condition, the rectifier network permits current flow in the clamp winding, generating magnetic flux in the core tending to oppose the magnetic flux in the secondary leg of the core, thereby limiting the voltage that can be produced between the secondary terminals. If the overvoltage condition persists, the Hopkins et al. circuit disables the oscillator.

Another concern with known neon power supplies, is the potential that a ground fault from the high voltage outputs of the power supply can create substantial current flows, potentially causing fires if the ground fault creates an arc involving flammable materials. A potentially dangerous ground fault current may occur anytime there is a relatively low impedance path from one of the high voltage output leads of the neon power supply to ground. Such a path may be formed if a neon sign is carelessly installed so that one of the output leads connected to the sign is in contact with a low impedance in a window frame, doorway, or other ground-connected relatively low impedance.

To detect ground fault current, it is typically necessary to couple a ground fault detection circuit to the secondary winding of the power supply transformer, and/or to the neon sign itself. Specifically, the ground fault detection circuit may be coupled between a path to ground, and either a center tap of the secondary winding of the transformer, and/or a return point located near the electrical mid-point of the neon tubing.

Because the ground fault detection circuit is directly connected between ground and the secondary, it must be isolated from the primary side of the main transformer. Accordingly, it is typically necessary to include an auxiliary transformer in the ground fault circuit, to deliver isolated power from the AC source to the ground fault circuit, and/or to transmit an isolated ground fault detection signal to the primary side of the main transformer for the purpose of removing primary power. Unfortunately, particularly where the auxiliary transformer operates at the 60 Hz line frequency, the auxiliary transformer can become prohibitively large and expensive.

A ground fault detection circuit, which does not require an auxiliary transformer, is shown by Pacholok, U.S. Pat. No. 5,089,752. In this patent, the transformer core is used as an isolated, single-wire, "capacitive center tap" to the secondary winding of the main transformer. The theory behind this circuit, is that a ground fault current flowing, for example, into the center tap of the secondary, and out through one of the windings, will create an imbalance between the currents and voltages in the secondary windings on either side of the center tap, which will be manifested as an AC signal at the "capacitive center tap". An AC signal at the "capacitive center tap" thus indicates a ground fault, and can be detected by circuitry on the primary side of the main transformer.

Unfortunately, the Pacholok circuit requires careful balancing of very small parasitic capacitances between the secondary winding and transformer core. Due to variations in these capacitances, and their relatively small values, the Pacholok circuit can be too susceptible to noise and manufacturing variation to detect low-level ground fault currents.

Another ground fault detection circuit which does not require the inclusion of an auxiliary transformer is disclosed in the above-referenced U.S. patent application Ser. No 08/838,060. In the circuit disclosed in therein, electrical energy is collected from current flowing between two secondary windings, and used to supply operating power to a detection circuit on the secondary side of the transformer. The detection circuit detects ground fault currents flowing through an electrical impedance, and generates a shut off signal, which is passed to the primary side of the transformer through an optoisolator, and causes the oscillator to shut down. This circuit, however, requires circuitry on the secondary side of the transformer for collecting electrical energy from the secondary winding current as well as detecting ground fault current flow through the center tap, all of which can add to manufacturing expense.

SUMMARY OF THE INVENTION

Accordingly, there is a need for a relatively inexpensive power supply which is suitable for driving gas discharge lighting such as neon signs, and which prevents dangerous overvoltage output conditions and detects relatively low level ground fault currents, without requiring electrical energy collection on the secondary side.

In accordance with principles of the present invention, these needs are met by a power supply circuit of the kind which includes a transformer having primary and secondary windings and an oscillator for driving the primary winding in a bi-directional fashion. The transformer includes a clamp winding which is in proximity to and capacitively coupled to the secondary winding. The terminals of the clamp winding are connected to a current imbalance detection circuit for detecting imbalance between the current flowing into one clamp winding terminal and the current flowing out of the other clamp winding terminal. In a ground fault condition, ground fault current flows in an unbalanced fashion into the clamp winding terminal(s), and through the capacitive coupling to the secondary winding. This ground fault current is detected by the current imbalance detection circuit, causing the current imbalance detection circuit to generate an electrical signal indicative of ground fault current.

In specific embodiments, the transformer core and windings are then encased in a resinous material having a dielectric constant which is stable over temperature change, to stabilize the capacitive coupling between the clamp and secondary windings.

The oscillator may include a disabling function, which is activated upon detection of ground fault current by the current imbalance detection circuit, thus preventing a continued ground fault condition. The oscillator circuit may further include a latching function so that, once the oscillator is disabled, the oscillator remains disabled until power is removed, the fault is removed, and power is reapplied.

The clamp winding may also prevent overvoltage conditions. In this embodiment, the secondary winding is wound onto the transformer core over the clamp winding, ensuring magnetic as well as capacitive coupling between the two. The clamp winding terminals are connected via a rectifier circuit to a DC voltage source, e.g., to a rectified and filtered DC voltage source generated from AC power supplied to the power supply circuit. In an overvoltage condition, the rectifier circuit permits current to be induced in the clamp winding and flow into the DC voltage source, generating magnetic flux in the core tending to oppose the magnetic flux produced by the primary winding, and thereby limiting the voltage that can be produced between the secondary terminals.

The above and other objects and advantages of the present invention shall be made apparent from the accompanying drawings and the description thereof

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
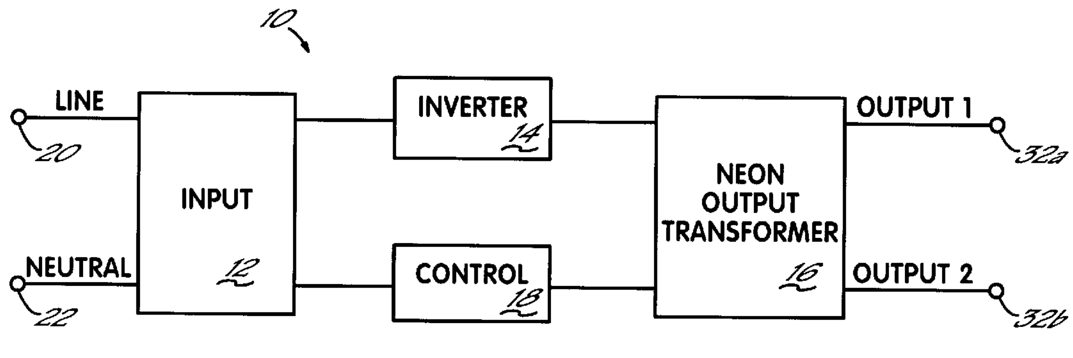
FIG. 1 is a block diagram of an electronic neon power supply in accordance with principles of the present invention.

Referring to FIG. 1, an electronic power supply 10 in accordance with the principles of the present invention can be broken into four major blocks as illustrated in FIG. 1. These are: INPUT block 12, which filters noise passing into and out of the unit, and rectifies and filters 120 VAC input power to develop an internal 170 VDC power source. INVERTER block 14, which chops the internal 170 VDC power source into an 80 VRMS square wave that can be applied to the neon output transformer. NEON OUTPUT TRANSFORMER block 16 which steps up the 80 VRMS from the inverter to a 9000 VRMS output voltage that is applied to the gas discharge tube. The leakage reactance of the neon transformer limits the output current to levels acceptable to the tubing. CONTROL block 18 which controls the frequency and wave shape generated by the inverter. Control block 18 also monitors the output voltage using a clamp winding and will shut off the inverter if an excessive output voltage is developed. Control block 18 also monitors secondary ground fault-related electrical signals which are detected by the clamp winding through capacitive coupling to the secondary winding, so that the inverter is shut off if an excessive secondary ground fault current is detected.

Figure 2:
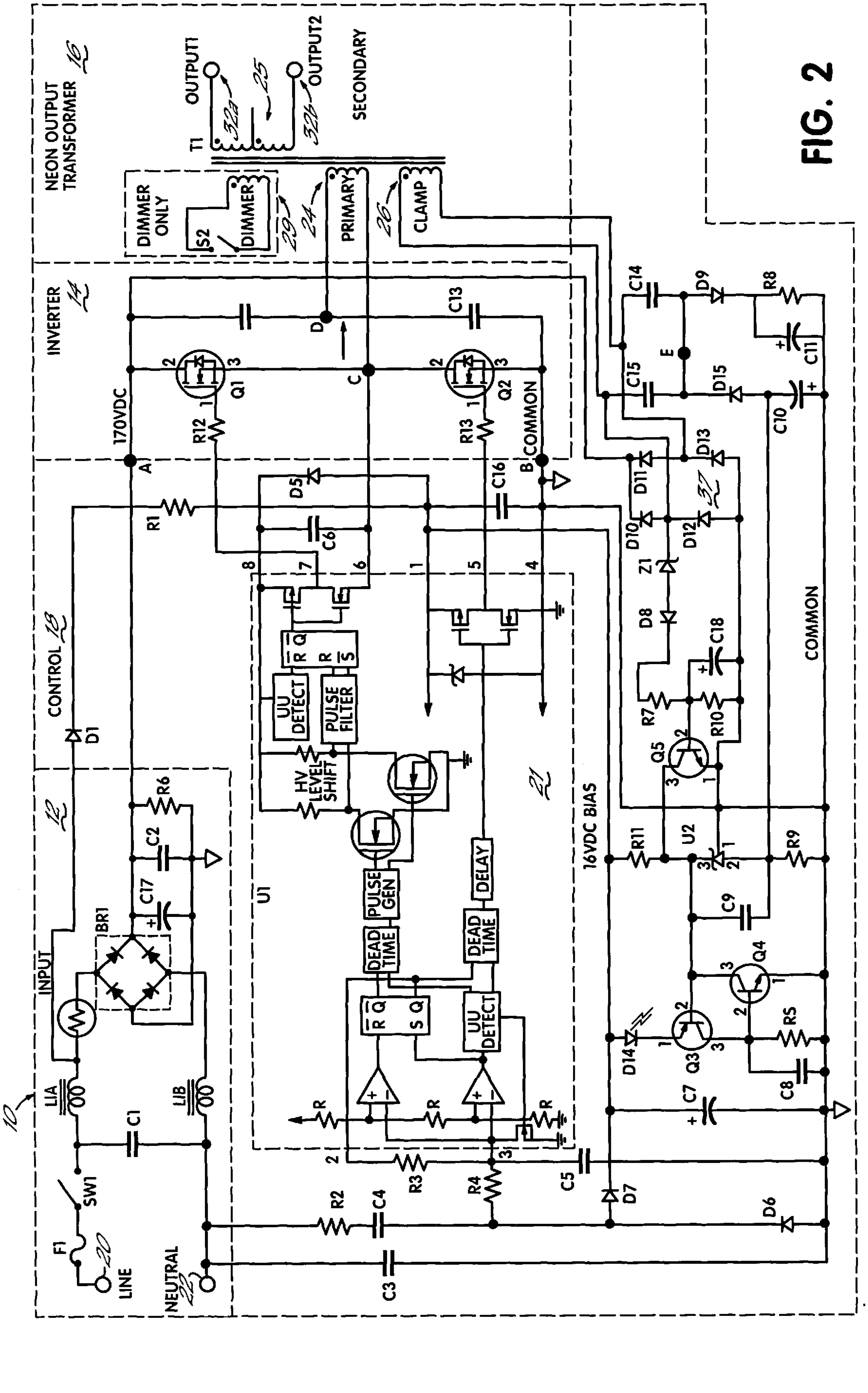
FIG. 2 is a circuit diagram of one implementation of the electronic neon power supply of FIG. 1.

Referring now to FIG. 2, details of blocks shown in FIG. 1 can be explored. AC power is applied to the Line and Neutral terminals 20, 22. Fuse F1 reduces the risk of fires by opening if there is an excessive input current. Switch SW1 allows the user to turn the unit on or off. Capacitor C1 and Inductors L1A and L1B filter the incoming AC power and reduce electromagnetic interference (EMI) that might be applied to the power lines by the Electronic Neon power supply. Thermistor T limits input current for the first few line cycles when the unit is turned on to reduce stress on internal components. Bridge rectifier BR1, which comprises four rectifiers in a bridge arrangement, rectifies the incoming AC power. Capacitor C17 smooths the rectified voltage to a level of 170 VDC which appears at node A. Capacitor C2 further reduces EMI. Resistor R6 discharges capacitors C17 and C2 when the input power is turned off. Thus a DC bulk voltage of 170 VDC is developed on node A, which can be used by the inverter.

The inverter block 14 chops the 170 VDC level developed by the input block 12 on node A, to produce an approximately 80 VRMS 20 Khz square wave on node C, that can be applied to the primary coil of the neon output transformer. The 170 VDC signal on node A is connected to capacitor C12, and the drain of transistor Q1. A common node B is connected to capacitor C13, and to the source of transistor Q2. Resistors R12 and R13 connect from integrated circuit U1 to the gates of transistors Q1 and Q2 respectively. The signals applied to resistors R12 and R13 by IC U1 are rectangular wave forms that are 180 degrees out of phase. Transistors Q1 and Q2 are turned on alternately by these signals. When transistor Q1 is turned on, node C is pulled high to approximately 120 Volts with respect to common node B. Node C is then pulled to near 0.0 V with respect to common node B when transistor Q2 is turned on. Capacitors C12 and C13 are connected together at node D. Node D, by virtue of this connection to capacitors C12 and C13, forms a center point that is between the potential of 170 VDC node A and common node B. When transistor Q1 is turned on, node C is more positive than node D. This results in current flow from node C through primary winding 24 of output transformer block 16 to node D. During the time when transistor Q2 is on, node C is less positive than node D, causing current to flow from node D through the primary winding 24 to node C. This provides alternating current through primary winding 24 that the transformer block 16 can utilize to develop the high voltage output.

The neon output transformer block 16 includes a transformer 23 comprising primary winding 24, and secondary winding 25. Transformer 23 provides isolation from input to output as well as a step up function to provide 9000 VAC output at terminals 32 of secondary winding 25. Additionally, transformer 23 includes a clamp winding 26 which provides output voltage and fault load information to the control block 18. The clamp winding 26 in conjunction with the control block 18 circuitry limits the maximum output voltage, and shuts down the power supply if an open circuit condition persists or a secondary ground fault is detected. Finally, transformer 23 may include an optional dimmer winding 29, which controls the current flow through secondary winding 25 to dim the sign output.

Figure 3:
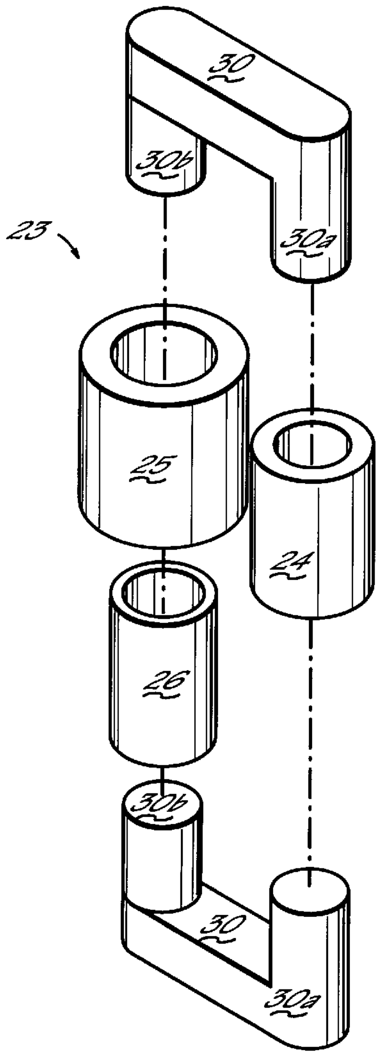
FIG. 3 is a schematic perspective drawing of a transformer core for the electronic neon power supply of FIG. 2, used in an embodiment which does not have a dimming feature.

Referring now to FIG. 3, when the dimmer winding is not included in transformer 23, the core which forms the base of transformer 23 is a double U-shape core 30, molded from ferrite material. A primary leg 30*a* of the core passes through the bobbin wound primary winding 24 while a secondary leg 30*b* passes through the secondary and clamp windings 25 and 26. The bobbin wound clamp winding 26 is concentric with and inserted into the secondary winding 26 bobbin. The transformer 23 is vacuum encapsulated with a specially formulated epoxy resin with a temperature stable dielectric constant. One suitable resin can be formed from resin #282 using hardener #260, sold by Restek, a division of Fel-Pro, 6120 East 58$^{th}$ Avenue, Commerce City, Colo. 80022. The temperature stability of the dielectric constant of the resin controls the inter-winding capacitance between the secondary and clamp windings 25, which capacitance is used to transfer secondary ground fault loading information to the control block 18.

The rectangular shaped alternating voltage developed by the inverter between nodes C and D (FIG. 2) is applied to the transformer primary winding 24. This magnetically excites the core material producing an alternating magnetic flux in the primary leg 30*a*. A significant portion of this flux travels through the secondary leg 30*b* of the U core where the secondary and clamp windings are mounted. This induces a voltage in the secondary winding 25 between its terminals 32*a* and 32*b* which is sufficient to strike an arc in the gas discharge tube. The clamp winding 26 is magnetically coupled to the secondary winding 25 in such a manner that the clamp winding voltage is proportional to the secondary voltage by the ratio of the respective number of turns on each winding.

Figure 4:
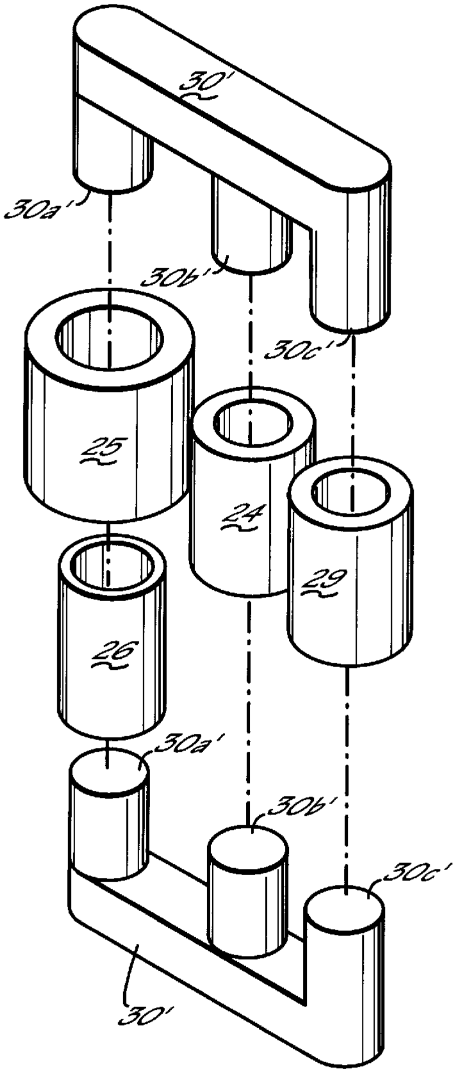
FIG. 4 is a schematic perspective drawing of a transformer core for the electronic neon power supply of FIG. 2, used in an embodiment which includes a dimming feature.

FIG. 4 depicts a similar transformer that includes a dimming feature. In this embodiment, the transformer core 30' which forms the base of transformer 23 is a double E-shape. As in the core 30 shown in FIG. 3, a primary leg 30*a*' of the core 30' passes through the bobbin wound primary winding 24 while a secondary leg 30*b*' passes through the secondary and clamp windings 25 and 26. As before, the clamp winding 26 is concentric with and inserts into the secondary winding 25, and the assembled core is encapsulated in an epoxy resin with a temperature stable dielectric constant to control the inter-winding capacitance between the secondary and clamp windings 25 and 26. Transformer core 30' further includes a third leg 30*c*', which passes through the bobbin-wound dimmer winding 29. Notably, third leg 30*c*' is in parallel with secondary leg 30*b*' of transformer core 30'. As a result, magnetic flux induced in the core in primary leg 30*a*' divides and flows through secondary leg 30*b*' and third leg 30*c*'. As described in substantially greater detail in the above-referenced U.S. Pat. No. 5,550,437, which is incorporated by reference herein in its entirety, dimmer winding 29 and leg 30*c* ' of transformer 30 can be used to control the current delivered to the terminals 32 of the secondary winding 25, and thus control the brightness of the sign. Specifically, when the terminals of dimmer winding 29 are shorted together (dimmer switch 52 of FIG. 2 is closed), current induced in dimmer winding 29 blocks the passage of any substantial magnetic flux through leg 30*c*', forcing substantially all of the magnetic flux generated by primary winding 24 to pass through secondary leg 30*b*'. However, when the terminals of dimmer winding 29 are open (switch 52 of FIG. 2 is open), current cannot be induced in dimmer winding 29, and thus a substantial portion of the magnetic flux generated by primary winding 24 is shunted through leg 30*c*' and does not pass through secondary leg 30*b*'. In the latter case, due to the shunting of flux through leg 30*c*', the power delivered to the terminals of secondary winding 25 is substantially reduced as compared to the former case where very little flux is shunted through leg 30*c*'. Thus, the latter case, the light is illuminated more dimly than the former case.

Referring again to FIG. 2, the clamp winding 26 is connected to the control block 18 which monitors the clamp winding peak voltage. If the peak voltage exceeds a predetermined limit, the clamp winding 26 begins to conduct current, diverting energy from the secondary winding 25 and thereby limiting the maximum secondary voltage during open circuit conditions (e.g., broken or disconnected tubing). Details on this aspect of the clamp winding are provided in the above referenced U.S. Pat. No. 5,550,437, which is incorporated by reference herein in its entirety. The clamp winding 26 is also monitored by the control block 18 to detect other conditions that will be discussed in the following description of the control block 18.

The control block 18 shown in FIG. 2 drives the inverter transistors Q1 and Q2 with the correct frequency and wave shape. It monitors the clamp winding 26 and allows clamp winding current to flow if the peak voltage of the clamp winding 26 exceeds 170 VDC, thereby limiting the secondary voltage to about 12 KVpeak. If the secondary winding 25 is connected to a tubing overload that results in a prolonged peak voltage greater than 10 KV, the control block 18 circuit will shut off the neon power supply 10. The relative voltages at each end of the clamp winding 26 with respect to common are also monitored. Normally these voltages are equal and opposite, and when summed, result in near 0 volts. If the voltages at the ends of the clamp winding 26 are unbalanced by a secondary ground fault, the resulting voltage is no longer 0 volts and the control block 18 shuts down the inverter.

Bias voltage to operate the control block 18 is derived from the input line AC power. When the line terminal 20 is positive with respect to the neutral terminal 22, current flows from inductor L1A through rectifier diode D1 and current limiting resistor R1 charging capacitors C7 and C16 relative to circuit common node B. When the line terminal 20 is negative, diode D1 blocks current flow. When the voltage on capacitors C7 and C16 reaches approximately 16 VDC, a zener diode 21 internal to the half bridge driver U1 conducts, limiting the voltage to that level. Thus, this circuitry produces a 16 Volt DC bias voltage on capacitors C7 and C16 relative to circuit common node B, suitable for powering the circuitry of control block 18.

Half bridge driver U1 is an integrated circuit used in conjunction with other components to determine the operating frequency of the inverter and alternately drive MOSFET transistors Q1 and Q2 at that frequency. A suitable integrated circuit U1 can be obtained from International Rectifier, 233 Kansas Street, El Segundo, Calif. 90245, as part nos IR2151 or IR2155. Current flow out of U1 pin 2 charges capacitor C5 through resistor R3. When the voltage across capacitor C5 charges to an upper threshold voltage determined by U1, the current flow from U1 pin 2 is interrupted and U1 pin 2 is internally connected to the circuit common node B through U1 pin 4. Capacitor C5 then begins to discharge to common node B through resistor R3 and U1. When the voltage across capacitor C5 reaches the lower threshold determined by U1, pin 2 of U1 is internally disconnected from common node B, and current from U1 pin 2 begins charging capacitor C5 through resistor R3 again. This cycle repeats indefinitely so long as power is applied. The time required for capacitor C5 to charge and discharge between thresholds determines how long either U1 pin 7 or pin 5 turn on the MOSFET inverter transistors Q1 and Q2 through resistors R12 and R13, respectively.

The time that each inverter transistor Q1 and Q2 is turned on is not a constant. If the transistors were driven on for equal time periods, an acoustic resonance in neon tubing connected to secondary terminals 32*a* and 32*b*, would cause undesirable bubbles to form in the ionized gas. This problem is discussed in detail in U.S. Pat. No. 4,682,082, assigned to the same assignee as the present application, and incorporated by reference herein in its entirety. Bubbles are overcome by unbalancing the times that each transistor is turned on. During the negative half cycle of the line voltage transistor Q1 will be turned on for approximately 70% of the time period while transistor Q2 is turned on for only 30% of the time. When the line voltage swings positive transistor Q1 will be driven on for 30% and transistor Q2 for 70% of the period. This alternate action of unbalancing the on and off times first one way then the other eliminates acoustic resonance of the tubing, without causing mercury migration that can result when a net direct current component is present in fluorescent type tubing.

The unbalanced timing is achieved by injecting a small 60 Hz signal into the timing capacitor C5. When the line input terminal 20 is negative with respect to the neutral terminal 22, current flows from the neutral terminal into resistor R2, through capacitor C4, through resistor R4, and into timing capacitor C5. This additional current charges capacitor C5 relative to common node B, to the upper threshold more quickly, reducing the time that transistor Q1 is turned on. This additional current also supplies some current that opposes the discharge current drawn through resistor R3 from capacitor C5, prolonging the time needed to discharge capacitor C5 to the lower threshold established by IC U1. This results in transistor Q2 remaining on for 70% of the period. This process is reversed when the line input terminal 20 is negative with respect to the neutral terminal 22, in which case current flows from timing capacitor C5 through resistor R4, capacitor C4, and resistor R2, and into the neutral terminal 22, reducing the time that transistor Q2 is turned on by IC U1 to approximately 30% of the period, and increasing the one time of transistor Q1 to 70% of the period. Clamp diodes D8 and D7 limit the voltage excursion applied to the node between capacitor C4 and resistor R4 to approximately 0.6 volts negative and 16 volts positive with respect to common node B.

The clamp circuit limits the maximum peak voltage at the secondary winding terminals 32 to approximately 12 KV. The voltage appearing across the clamp winding is applied to a bridge rectifier 37 consisting of diodes D10, D11, D12 and D13. The bridge rectifier is connected between common node B and the 170 VDC bulk level on node A, across capacitors C17 and C2. If the peak voltage across the clamp winding 26 is greater than 170 VDC, the bridge rectifier 37 conducts whatever current is necessary to limit the clamp winding voltage to 170 VDC. The secondary winding 25 is closely coupled magnetically to the clamp winding 26 and is therefore limited to the clamped voltage multiplied by the ratio of secondary to clamp winding turns. In this way maximum output voltage is limited to a reasonable level. The operation of this circuit is virtually instantaneous.

The over voltage circuit turns the unit off if the voltage across the clamp winding 26 exceeds approximately 150 Vpeak more than a certain period of time, which corresponds to approximately 10 KV peak on the secondary winding. (A similar function is performed by the circuit disclosed in the above-referenced U.S. Pat. No. 5,550,437.) When the peak clamp voltage exceeds 150 V, zener diode Z1 conducts current through diode D8, resistor R7, and into resistor R10 and capacitor C18, charging capacitor C18. When capacitor C18 charges to approximately 0.6 volts, current flows into the base of transistor Q5. This causes transistor Q5 to turn on which pulls the base of transistor Q3 low, turning transistor Q3 on. Current from the 16 VDC bias flows through light emitting diode D14, out of the collector of transistor Q3, and into capacitor C8 and resistor R5, charging capacitor C8. When capacitor C8 charges to approximately 0.6 volts, current flows into the base of transistor Q4, turning transistor Q4 on. Once transistor Q4 is turned on, transistor Q4 holds the base of transistor Q3 low, holding transistor Q3 on. Transistor Q3, when on, supplies current to the base of 24, holding transistor Q4 on. Transistors Q3 and Q4 thus form a regenerative latch which will remain conducting until power is removed. Note that the path from the 16 VDC bias through diode D14, transistor Q3, and transistor Q4 is a low impedance path. When these components conduct, the current (as determined by resistor R1) is not sufficient to maintain the 16 Volt DC bias voltage at pin 1 of IC U1. The 16 Volt bias drops to approximately 2 VDC which is not sufficient to operate the half bridge driver U1. Drive signals to the inverter cease and the inverter is rendered inoperative. The input power must be turned off to release the regenerative latch, the problem corrected, and power turned on again to restore operation.

The transformer construction is an important part of the secondary ground fault sensing functions of the power supply circuit. The midpoint of the secondary winding 25 is not connected to ground therefore it cannot be assumed that each output lead 32 is one half the total output voltage with respect to ground. The voltage on each output lead 32 with respect to ground is determined by the impedance of all stray capacitances associated with each output terminal 32. The inter-winding capacitance between the secondary winding and the clamp winding is normally the lowest of these impedances and will dominate all others.

Figure 5:
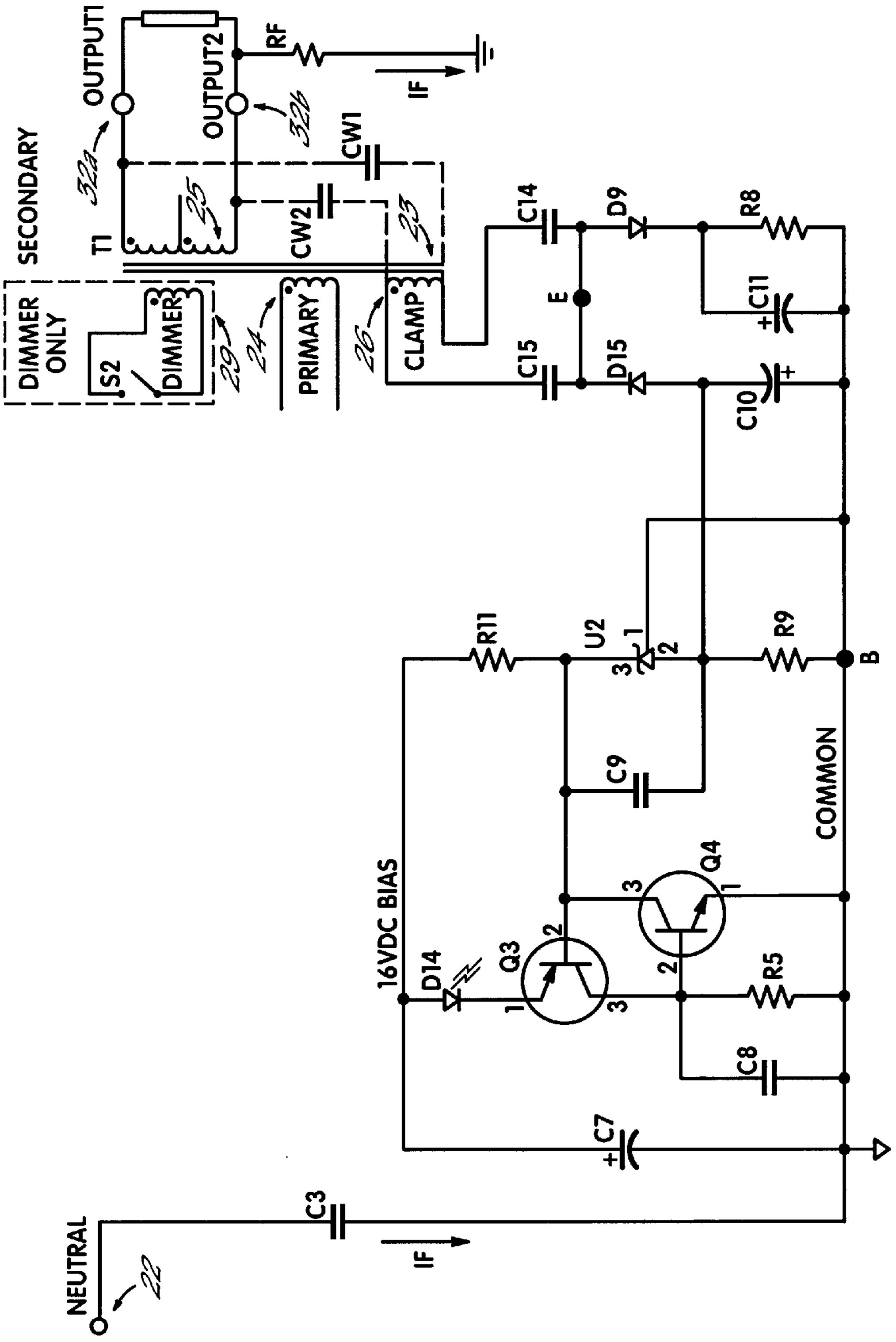
FIG. 5 is a circuit diagram of those circuit elements in the circuit diagram of FIG. 2 which detect and respond to ground fault currents in the secondary winding.

Referring to FIG. 5, the capacitance between secondary winding 25 and clamp winding 26 is distributed evenly across the length of the two windings and can be modeled by two equal capacitors, one from each end of the secondary to the corresponding end of the clamp winding (capacitors CW1 and CW2 in FIG. 5).

The ends of the clamp winding are connected to the secondary ground fault sensing circuit by two equal capacitors C14 and C15, the opposite terminals of which are connected together at a node E. Note that the four capacitors CW1, CW2, C14, and C15 are connected in series across the output terminals 32 and form a symmetrical voltage divider. The center of this voltage divider is node E, the junction between capacitors C14 and C15. The potential of node E with respect to ground midway between the voltages of the terminals of clamp winding 26, which is proportional to the potential at the center of the secondary winding 25.

The common node of the control circuit is connected to the Neutral input terminal 22 (which is grounded in the distribution mains) by capacitor C3, making the common node referenced to AC ground. If the current generated by the secondary winding 25 is balanced and does not include ground fault current, the current flowing through capacitors C14 and CW1 is equal to an opposite to the current flowing through capacitors C15 and CW2, accordingly, no net current flows to or from node E from or to circuit common node B. Thus, potential at the center of the secondary winding 25 is approximately equal to the potential of circuit common node B throughout the AC cycle. Under these circumstances no signal is developed to trigger the secondary ground fault sensing circuit.

Now examine the circuit when a fault load is connected to one side of the secondary winding 25. This load is represented by resistor Rf in FIG. 5. The potential of the secondary midpoint is now affected by resistor Rf as well as the inter winding capacitance. Resistor Rf is effectively in parallel with the portion of the circuit consisting of capacitors CW2, C15, diode D15, resistor R9 and capacitor C10. The impedance from output terminal 32*b* to ground is thus lower than the impedance from output terminal 32*a* to ground. Note that the AC fault current If through Rf into ground follows a path through capacitor C3 to the common node. It must now flow through the sensing network composed of resistors R8 and R9, capacitors C11 and C10, and diodes D9 and D15 to node E, then through capacitors C14 and CW1 to output terminal 32*a*. During the half-cycle when output terminal 32*b* is positive, ground fault current flows through resistor Rf into ground through capacitor C3 from AC ground to the common node B, through resistor R9 and capacitor C10 and through diode D15 to node E, then through capacitors C14 and CW1 to output terminal 32*a*. During the half cycle when output terminal 32*b* is negative, ground fault current flows from output terminal 32*a* through capacitors CW1 and C14 to node E, then through diode D9 and through resistor R8 and capacitor C11 into the common node B, then through capacitor C3, AC ground, and through resistor Rf to terminal 32*b*.

Resistor R9 and capacitor C10 form a low-pass filter which is driven by the rectified ground fault current flowing through resistor R9 and capacitor C10 via diode D 15. If there is any significant ground fault current flowing through diode D15, then the low-pass filter formed by resistor R9 and capacitor C10 develops a negative voltage with respect to the common node. This voltage is proportional to the fault current If. Thus a signal is generated within the control circuit that accurately represents secondary fault current flowing from the secondary winding 25 into ground.

Note that the negative voltage developed across resistor R9 is connected to the anode of shunt regulator U2 which is used as a precise comparator. U2 remains in a non-conducting state when the voltage between the reference and anode terminals is less than 2.50 Volts. However, if the voltage across resistor R9 representing fault current reaches 2.5 Volts, U2 conducts current from cathode to anode which pulls the base of transistor Q3 low, turning transistor Q3 on. The regenerative latch comprised of transistor Q3, transistor Q4, capacitor C8, and resistor R5 latches in a conducting state pulling current from the 16 volt bias through light emitting diode (LED) D14. This reduces the bias voltage to a level insufficient to operate the half bridge driver U1, inhibiting the inverter and turning off the output. The unit will remain off until the AC power is turned off and back on again. In this manner the sign installation is protected from secondary ground faults.

The following table identifies component values for the various components of the circuit diagram of FIG. 2 in accordance with one embodiment of the present invention:

| Component | Rating/Identification |
|---|---|
| R1 | 15 KΩ, 3 W |
| R2 | 270 KΩ, ½ W |
| R3 | 29.4 KΩ, ¼ W |
| R4 | 100 KΩ, ¼ W |
| R5 | 1 KΩ, ¼ W |
| R6 | 150 KΩ, ½ W |
| R7 | 6.8 KΩ, ¼ W |
| R8, R9 | 2.74 KΩ, ¼ W |
| R10 | 3.3 KΩ, ¼ W |
| R11 | 10 KΩ, ¼ W |
| R12, R13 | 2.2 ohm, ¼ W |
| TH1 | Thermistor - 10 Ω min., 2 A min |
| C1 | 0.1 μF, 250 V X-type |
| C2, C3, C4 | 0.1 μF, 250 V |
| C5 | 0.001 μF, 50 V |
| C6 | 0.47 μF, 50 V |
| C7 | 100 μF, 25 V |
| C8, C9 | 0.01 μF, 50 V |
| C10, C11, C18 | 47 μF, 25 V |
| C12, C13 | 1.0 μF, 250 V |
| C14, C15 | 0.001 μF, 250 V |
| C16 | 0.22 μF, 50 V |
| C17 | 220 μF, 200 V |
| BR1 | 400 V, 4 A |
| D1, D5 | 400 V, 1 A |
| D6, D7 | 75 V, 150 mA |
| D8, D9, D15 | 75 V, 150 mA |
| D10, D11, D12, D13 | 400 volt, 1 A |
| D14 | LED Red, 5 V, 25 mA |
| Q1, Q2 | MOSFET, 200 V, 6 A |
| Q3 | PNP, 40 V, 0.6 A |
| Q4, Q5 | NPN, 40 V, 0.6 A |
| U1 | IC Half Bridge Driver, 600 V, 0.1 A |
| U2 | IC Voltage Reference, 2.45 V, 0.1 A |
| L1 | EMI Inductor, 2.2 mH, 1.3 A |
| T1 | Neon output transformer |
| S1 | Switch, Pull Chain, 125 V, 3 A |
| F1 | Fuse PCB mount, 125 V, 5 A |
| Z1 | 150 Volt, ½ W |

While the present invention has been illustrated by a description of various embodiments and while these embodiments have been described in considerable detail, it is not the intention of the applicants to restrict or in any way limit the scope of the appended claims to such detail.

Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A ground fault protected power supply delivering high voltage electrical power to a gas discharge light and detecting ground fault current, comprising:

a transformer core of magnetically permeable material, a primary winding having first and second primary terminals, said primary winding wound on said transformer core such that current flowing in said primary winding induces magnetic flux in said transformer core, an oscillator connected to said primary terminals to supply alternating current thereto to induce magnetic flux in said transformer core, a secondary winding having first and second secondary terminals, said secondary winding wound on said transformer core such that magnetic flux in said transformer core induces current in said secondary winding, said secondary terminals supplying electrical power to said gas discharge light, a clamp winding having first and second clamp winding terminals, said clamp winding being wound on said transformer core such that magnetic flux in said transformer core induces current in said clamp winding, said clamp winding being wound on said transformer core adjacent to said secondary winding such that said clamp winding is capacitively coupled to said secondary winding, current imbalance detection circuitry connected to said clamp winding terminals for detecting imbalance between current flowing into the first clamp winding terminal and current flowing out of the second clamp winding terminal, said current imbalance detection circuitry generating a ground fault electrical signal upon detection of a current imbalance between said first and second clamp winding terminals.

2. The circuit of claim 1, wherein said secondary winding is wound onto said transformer core over said clamp winding.

3. The circuit of claim 1, wherein said secondary winding and clamp winding windings are encased in a resinous material having a dielectric constant which is stable over temperature change.

4. The circuit of claim 1, further comprising a comparator for comparing the ground fault electrical signal to a threshold, the comparator connected to the oscillator for shutting down the oscillator upon detection of a ground fault electrical signal in excess of the threshold.

5. The circuit of claim 4, wherein said oscillator includes a latch circuit for holding said oscillator in a shut down condition after said oscillator has been shut down by said comparator.

6. The circuit of claim 1 wherein said current imbalance detection circuitry comprises an impedance having a first terminal connected to said first and second clamp winding terminals and a second terminal connected to a path to ground, said current imbalance detection circuitry producing a ground fault electrical signal proportional to current flow through said electrical impedance between said clamp winding terminals and a path to ground.

7. The circuit of claim 6 wherein said electrical impedance is connected to a path to ground through first and second rectifiers, said first rectifier permitting current flow from earth ground to said first and second clamp windings but preventing reverse current flow, said second rectifier permitting current flow from said first and second clamp winding terminals to ground but preventing reverse current flow.

8. The circuit of claim 7 wherein said electrical impedance includes a low-pass filtering circuit in series with one of said rectifiers, said low-pass filtering circuit being driven by rectified current flowing through said rectifier to generate said ground fault electrical signal proportional to current flow through said electrical impedance between said clamp winding terminals and earth ground.

9. The circuit of claim 1 further comprising a power line rectifier for rectifying alternating current power from an alternating current power source into a direct current power source between first and second DC power terminals, said oscillator connected to said power line rectifier, said oscillator alternately connecting said first primary terminal to said first and second DC power terminals to supply alternating current to said primary winding to induce magnetic flux in said transformer core.

10. The circuit of claim 9 further comprising a clamp winding rectifier connected between said clamp winding terminals and said first and second DC power terminals, said clamp winding rectifier permitting current flow from said clamp winding terminals into said DC power terminals when a voltage across said clamp winding terminals exceeds a threshold voltage, whereby current flow in said clamp winding prevents excessive voltage across said secondary winding terminals.

11. The circuit of claim 1 further comprising an overvoltage detection circuit comparing a voltage across said clamp winding terminals to a threshold, the overvoltage detection circuit connected to the oscillator for shutting down the oscillator upon detection of a voltage across said clamp winding terminals in excess of the threshold.

12. The circuit of claim 11 wherein said overvoltage detection circuit comprises a rectifier, a zener rectifier, and a low pass filtering circuit connected in series between said clamp winding terminals, said rectifier and zener rectifier permitting rectified current flow through said low pass filtering circuit only when a voltage across said clamp winding terminals exceeds the threshold, said low pass filtering circuit generating an electrical signal proportional to the amount of time during which the voltage across said clamp winding terminals exceeds the threshold.

13. The circuit of claim 1 wherein said transformer core comprises a primary leg, a secondary leg, and a third leg, said primary, secondary and third legs being configured such that magnetic flux generated in said primary leg divides and flows through said secondary leg and third leg in parallel, wherein said primary winding is wound on said primary leg, said secondary winding is wound on said secondary leg, and further comprising a dimmer winding having first and second dimmer terminals, wound on said third leg.

14. The circuit of claim 13 further comprising a dimmer switch connected between said dimmer terminals, said dimmer switch having a open position in which current may not flow between said dimmer terminals and a closed position in which current flows between said dimmer terminals.

15. A method of delivering high voltage electrical power to a gas discharge light while detecting ground fault current, comprising:

providing a transformer core of magnetically permeable material, winding a primary winding having first and second primary terminals, on said transformer core such that current flowing in said primary winding induces magnetic flux in said transformer core, supplying alternating current to said first and second primary terminals to induce magnetic flux in said transformer core, winding a secondary winding having first and second secondary terminals, on said transformer core such that magnetic flux in said transformer core induces current in said secondary winding, connecting said secondary terminals to said gas discharge light to supply electrical power thereto, winding a clamp winding having first and second clamp winding terminals, on said transformer core such that magnetic flux in said transformer core induces current in said clamp winding, said clamp winding being wound on said transformer core adjacent to said secondary winding such that said clamp winding is capacitively coupled to said secondary winding, detecting imbalance between current flowing into the first clamp winding terminal and current flowing out of the second clamp winding terminal, and identifying a ground fault upon detection of a current imbalance between said first and second clamp winding terminals.

16. The method of claim 15, wherein said secondary winding is wound onto said transformer core over said clamp winding.

17. The method of claim 15, further comprising encasing said secondary winding and clamp winding windings in a resinous material having a dielectric constant which is stable over temperature change.

18. The method of claim 15, further comprising comparing to a threshold any imbalance between current flowing into the first clamp winding terminal and current flowing out of the second clamp winding terminal, and ceasing supply of alternating current to said first and second primary terminals upon detection of current imbalance in excess of the threshold.

19. The method of claim 15 further comprising rectifying alternating current power from an alternating current power source into a direct current power source between first and second DC power terminals, and wherein alternating current is supplied to said primary winding by alternately connecting said first primary terminal to said first and second DC power terminals to supply alternating current to said primary winding to induce magnetic flux in said transformer core.

20. The method of claim 19 further comprising permitting current flow from said clamp winding terminals into said DC power terminals when a voltage across said clamp winding terminals exceeds a threshold voltage, whereby current flow in said clamp winding prevents excessive voltage across said secondary winding terminals.

* * * * *